April 21, 1964     J. J. PRIAPI     3,129,561
ROCKET ENGINE IGNITER
Filed Sept. 9, 1960
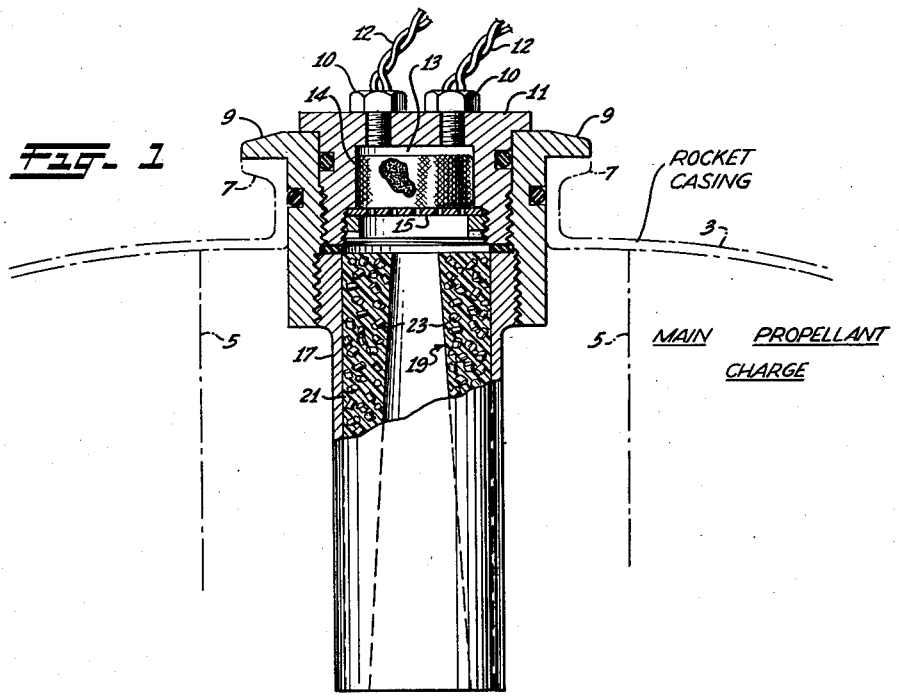
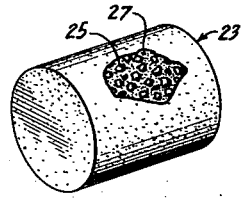
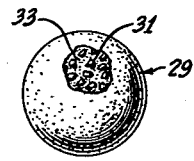
INVENTOR:
JOSEPH J. PRIAPI
BY
ATTORNEYS

United States Patent Office 3,129,561
Patented Apr. 21, 1964

3,129,561
ROCKET ENGINE IGNITER
Joseph J. Priapi, Menlo Park, Calif., assignor to United Aircraft Corporation, a corporation of Delaware
Filed Sept. 9, 1960, Ser. No. 54,966
4 Claims. (Cl. 60—35.6)

This invention relates to an improved solid propellant ignition system. It is designed to produce satisfactory ignition for solid propellant rocket motors over a wide range of operating conditions, to increase ignition reliability and reproducibility and to reduce ignition peak pressures.

Heretofore, the most common methods of igniting solid propellant rockets have been either by a pellet type igniter or by a rocket engine type igniter. The pellet igniter consists of a pyrotechnic device wherein pellets of an explosive mixture are ignited which drive hot gas and particles into the propellant, igniting the propellant. It is sometimes difficult to secure uniform ignition when using this system and high peak ignition pressures are encountered. The rocket engine type of igniter essentially consists of a pressure vessel filled with a propellant mixture comprising a small rocket engine which produces a supersonic flow of hot gas against the propellant grain causing the grain to ignite. Hot particles (which would be highly desirable) are absent in the gas stream.

In accordance with the present invention, an igniter for solid propellant engine systems is provided which combines the advantageous features of the pellet type of igniter with those of the rocket engine type of igniter but without the drawbacks of either system. Generally speaking, the invention is accomplished by providing pellets of a finely divided metal together with an oxidizer with the pellets held in a matrix of a rocket propellant. The matrix is formed into the shape of a standard internal burning charge and there is no nozzle or restriction at the end thereof, so that the flow of gas is subsonic.

In the drawings forming part of this application:

FIGURE 1 is a partial sectional view of the head-end of a rocket engine showing an igniter in place embodying the present invention.

FIGURE 2 is an enlarged perspective view, partly in section, showing one form of pellet which can be employed in fabricating the igniter.

FIGURE 3 is a view, similar to FIGURE 2, showing another form of pellet.

Referring now to the drawings by reference characters, there is shown a portion of a rocket engine casing 3 having a propellant grain 5 therein. The casing has a boss 7 which serves to retain the adapter 9. The initiator assembly 11 is threadably mounted in the adapter. The initiator assembly has the electric squibs 10 therein, connected by means of wires 12 to a source of electricity, not shown. The initiator assembly comprises a first chamber 13 which is filled with an igniter mixture 14, such as black powder or igniter pellets. This is retained on the perforated plate 15. The igniter itself consists of a generally cylindrical chamber 17 which is threadably mounted in the adapter ring 9. The chamber 17 is filled with an ignition mixture 19 which is described hereinafter. The mixture 19 can be placed in the chamber 17 in any of the convention configurations but is preferably formed into a standard internal burning, tapered charge configuration such as that shown. Generally speaking the ignition mixture contains a matrix 21 of a propellant mixture in which are encased pellets 23 of suitable size and shape as is hereinafter described.

The pellets themselves form no part of the present invention since such ignition pellets have been long known. Generally speaking the pellets consists of a mixture of a metal and an oxidizer. The metal is in the form of a relatively fine powder while the oxidizer is formed as a matrix around the metal particles. As an example, the metal can be boron and the oxidizer potassium nitrate or the particles of metal might be aluminum powder while the oxidizer is ammonium perchlorate. About one-fourth of the pellet is a finely divided metal, the balance being an oxidizer together with a small amount of a binder. The pellets can be cylindrical as is shown in FIGURE 2 where a single pellet grain 23 is shown. Here the metal particles 25 are surrounded by the oxidizer matrix 27. In this particular embodiment, the pellets are in the form of small cylinders one-eighth inch in diameter and three-sixteenth inch long. In that form as shown in FIGURE 3, the pellets 29 are in the form of a small sphere one-eighth to one-fourth inch in diameter. Again the metal particles 31 are surrounded by the oxidizing matrix material 33.

The ignition composition contains a matrix material 21 which can be any suitable propellant mixture such as the double base or composite propellant systems including those employing a fuel-binder such as polyurethane, polybutadiene, acrylic acid and the like together with a conventional oxidizer such as ammonium perchlorate or ammonium nitrate. The pellets are incorporated in the propellant mixture, preferably in a proportion of 50 to 75% by weight.

To initiate the ignition it is only necessary to supply electricity through the wires 12 to the squibs 10. The squibs 10 in turn ignite the charge 14 blowing hot combustion products through the perforated plate 15 which ignites the propellant charge 19. This in turn ignites the main propellant charge 5.

I claim:

1. An igniter for a solid propellant rocket engine, said engine having a combustion chamber confining a solid propellant, said propellant having a passage extending therethrough co-axially with the axis of the engine, said passage extending the length of the engine so as to define an internal burning charge, said igniter comprising:
    (a) an open-ended cylindrical chamber positioned at one end of said passage, said open end of said chamber being directed down the passage;
    (b) a matrix of a solid rocket propellant comprising a mixture of a fuel binder and an oxidizer having dispersed therein solid pellets, said pellets comprising finely divided metal and an oxidizer therefor, all of said pellets being dispersed within and surrounded by said matrix, said matrix being confined by said cylindrical open-ended chamber, said matrix having a passage extending therethrough co-axially with the axis of the engine;
    (c) ignition means for said matrix positioned at one end thereof; and
    (d) said igniter providing a subsonic flow of hot gas having hot metallic particles therein for the ignition of the solid propellant of the rocket engine.

2. The igniter assembly of claim 1 wherein the pellets contain a mixture of boron and potassium nitrate.

3. The igniter of claim 1 wherein the pellets comprise a mixture of aluminum and ammonium perchlorate.

4. The igniter of claim 1 wherein the pellets comprise from 50 to 75% of the igniter mixture.

References Cited in the file of this patent
UNITED STATES PATENTS

| | | |
|---|---|---|
| 2,906,094 | Damon et al. | Sept. 29, 1959 |
| 2,914,910 | King | Dec. 1, 1959 |
| 2,935,839 | Beatty et al. | May 10, 1960 |
| 2,955,535 | Show et al. | Oct. 11, 1960 |
| 2,959,001 | Porter | Nov. 8, 1960 |
| 2,980,021 | Adelman | Apr. 18, 1961 |
| 2,990,683 | Walden | July 4, 1961 |